(12) United States Patent
Namballa

(10) Patent No.: US 11,068,592 B1
(45) Date of Patent: Jul. 20, 2021

(54) LOOKAHEAD SIGNATURE-BASED MALWARE DETECTION

(71) Applicant: Malwarebytes Inc., Santa Clara, CA (US)

(72) Inventor: Ravi Kalyan Namballa, Tampa, FL (US)

(73) Assignee: Malwarebytes Inc., Santa Clara, CA (US)

( * ) Notice: Subject to any disclaimer, the term of this patent is extended or adjusted under 35 U.S.C. 154(b) by 0 days.

(21) Appl. No.: 17/158,958

(22) Filed: Jan. 26, 2021

(51) Int. Cl.
*G06F 9/44* (2018.01)
*G06F 21/56* (2013.01)
*G06F 9/48* (2006.01)

(52) U.S. Cl.
CPC .......... *G06F 21/564* (2013.01); *G06F 9/4881* (2013.01); *G06F 2221/033* (2013.01)

(58) Field of Classification Search
CPC ....................................................... G06F 9/44
See application file for complete search history.

(56) References Cited

U.S. PATENT DOCUMENTS

| | | | | |
|---|---|---|---|---|
| 2005/0149749 A1* | 7/2005 | Van Brabant | ......... | G06F 21/564 726/24 |
| 2006/0236398 A1* | 10/2006 | Trakic | ................... | G06F 21/562 726/24 |
| 2011/0239298 A1* | 9/2011 | Burtscher | ............. | G06F 21/564 726/23 |

* cited by examiner

*Primary Examiner* — Jae U Jeon
(74) *Attorney, Agent, or Firm* — Fenwick & West LLP

(57) ABSTRACT

A computing device determines, for a first time period, a usage-based file list identifying one or more executable files. The computing device determines, for each of the one or more executable files identified by the usage-based file list, whether to perform a malware scan upon the executable file based on a cached record for the executable file. The computing device schedules, for execution during a preceding time period before the first time period, a malware scan for at least one of the one or more executable files based on the corresponding determination of whether to perform a malware scan. Each scheduled malware scan is initiated as a low priority thread for execution. The computing device performs each scheduled malware scan during the preceding time period.

20 Claims, 4 Drawing Sheets

500

Determine a usage-based file list identifying one or more executable files for a first time period
502

↓

Determine, for each executable file, whether to perform a malware scan based on a cached record for the executable file
504

↓

Schedule, for execution during a preceding time period before the first time period, a malware scan for at least one of the one or more executable files, based on the corresponding determination of whether to perform a malware scan
506

↓

Perform each scheduled malware scan during the preceding time period
508

500

```
┌─────────────────────────────────────────┐
│ Determine a usage-based file list       │
│ identifying one or more executable      │
│ files for a first time period           │
│ 502                                     │
└─────────────────────────────────────────┘
                    │
                    ▼
┌─────────────────────────────────────────┐
│ Determine, for each executable file,    │
│ whether to perform a malware scan based │
│ on a cached record for the executable   │
│ file                                    │
│ 504                                     │
└─────────────────────────────────────────┘
                    │
                    ▼
┌─────────────────────────────────────────┐
│ Schedule, for execution during a        │
│ preceding time period before the first  │
│ time period, a malware scan for at      │
│ least one of the one or more executable │
│ files, based on the corresponding       │
│ determination of whether to perform a   │
│ malware scan                            │
│ 506                                     │
└─────────────────────────────────────────┘
                    │
                    ▼
┌─────────────────────────────────────────┐
│ Perform each scheduled malware scan     │
│ during the preceding time period        │
│ 508                                     │
└─────────────────────────────────────────┘
```

LOOKAHEAD SIGNATURE-BASED MALWARE DETECTION

FIELD OF ART

The present disclosure generally relates to preventing malware and more specifically to reducing the computational burden of malware detection.

BACKGROUND

Anti-malware products employ signature-based and signature-less malware detection techniques. Malware detection techniques are often computationally intensive and typically impact system performance. Furthermore, malware detection techniques are often applied during user interaction with a computing device, for example, upon launching an executable file. As such, the impact to system performance due to anti-malware products often occurs just when computing resources are being directed towards other tasks, such as file execution. This can delay those other tasks, decreasing system performance.

SUMMARY

In an embodiment, a method involves a computing device determining, for a future first time period, a usage-based file list that identifies one or more executable files predicted to be used during the future first time period. The one or more executable files in the usage-based file list may be a set of computer applications that were initiated during a past time period (e.g., of a preceding day) that corresponds to the future first time period. For example, predicting which applications will be used during the future first time period of 2:00 PM to 3:00 PM today may be based on tracked usage of applications during the corresponding time period of 2:00 PM to 3:00 PM yesterday.

The method further involves a computing device determining, for each of the one or more executable files identified by the usage-based file list, whether to perform a malware scan of the executable file based on a cached record for the executable file. The cached record may include information about a past malware scan performed for the respective executable file.

The method further involves a computing device scheduling, for execution during a preceding time period before the first time period, a malware scan for at least one of the one or more executable files based on the corresponding determination of whether to perform the malware scan. The preceding time period for performing the scan may be, for example, a one-hour window prior to the first time period when the application is predicted to be used. For example, if the application is predicted to be used during a first time period of 2:00 PM to 3:00 PM today, the preceding time period for scanning the application may chosen to be 1:00 PM to 2:00 PM today. Each scheduled malware scan is scheduled as a low priority thread for execution. For example, each scheduled malware scan may be scheduled as a background process that only executes at times when there is no high priority or foreground process to execute.

The method further involves a computing device performing each scheduled malware scan during the preceding time period. For example, if no foreground processes are scheduled for execution, the computing device performs one or more of the scheduled malware scans at that time.

In another embodiment, a non-transitory computer-readable storage medium stores instructions that when executed by a processor causes the processor to execute the above-described method.

In yet another embodiment, a computer system includes a processor and a non-transitory computer-readable storage medium that stores instructions for executing the above-described method.

BRIEF DESCRIPTION OF THE DRAWINGS

The figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

FIG. 5 is a flowchart illustrating an embodiment of a process for performing lookahead signature-based malware detection.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

A computing device includes a protection application, e.g., an anti-malware application, that scans executable files to determine whether the scanned files are malware. The protection application intelligently schedules pre-scanning of executable files prior to launch to reduce launch-time scans and improve system performance, as described herein. To perform lookahead malware scanning, the protection application tracks the times at which different applications are launched upon the computing device and uses this information to predict future usage times and schedule future scans such that they occur before the predicted launch time. Using the techniques described herein, these lookahead malware scans can be performed reasonably close to the launch times of respective applications to catch immediate threats, thus improving system security and performance.

Figure 1:
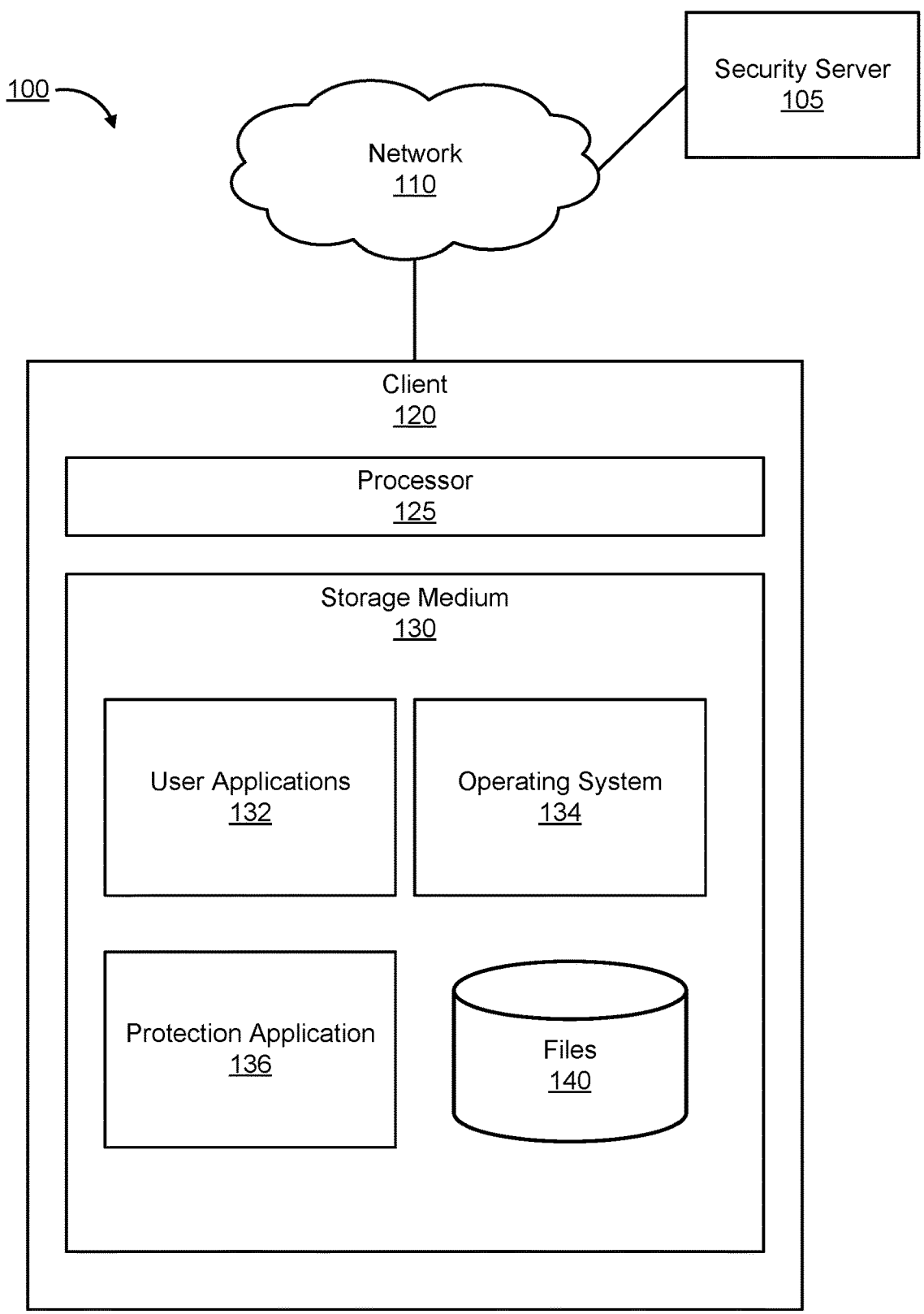
FIG. 1 is a system diagram illustrating an example embodiment of an environment in which a protection application and a security server execute.

FIG. 1 is a system diagram illustrating an example embodiment of an environment in which a protection application and a security server execute. The system environment 100 comprises a security server 105, a network 110, and a client 120 (also referred to as a client device 120). For simplicity and clarity, only one security server 105 and one client 120 are shown; however, other embodiments may include different numbers of security servers 105 and clients 120. Furthermore, the system environment 100 may include different or additional entities in alternative embodiments.

The security server 105 is a computer system configured to store, receive, and transmit data to clients 120 or to other servers via the network 110. The security server 105 may include a singular computing system, such as a single computer, or a network of computing systems, such as a data center or a distributed computing system. The security server 105 may receive requests for data from clients 120 and respond by transmitting the requested data to the clients 120. The security server 105 includes a database of information (such as malware signature-based definitions) about known malware (e.g., a blacklist), clean files (e.g., a whitelist), or both. Further, the security server 105 may distribute relevant definitions to the client 120 to enable the client to perform malware detection.

The security server 105 sends a list of file signatures to the client 120, either periodically or in response to some condition. In an embodiment, the security server 105 sends a list of file signatures to the client 120 multiple times per day, either when definitions are updated, at regular intervals, or when requested by the client 120.

In an embodiment, the client 120 sends requests for lists of file signatures to the security server 105, and the security server 105 sends lists of file signatures to the client 120 responsive to the requests. The requests may be sent by the client 120 periodically. The security server 105 responds to a request for a list of file signatures received from the client 120 with a list of file signatures if the current list of file signatures at the security server 105 differs from the current list of file signatures at the client 120 (e.g., if the current list of file signatures at the security server 105 has additional file signatures when compared to the current list at the client 120, or if file signatures have been removed from the current list of file signatures of the security server 105 when compared to the current list at the client 120). If the list of file signatures at the security server 105 matches the list of file signatures at the client 120, the security server 105 does not send a list of file signatures to the client 120, and may send to the client 120 a message indicating that the list of file signatures at the client 120 is up to date.

A file signature includes data used to identify or verify the contents of a file. For example, a file signature may be a sequence of bytes in a file's header, a hash associated with the file, or other characteristic of a file sought to be identified. The file signatures in the list of file signatures may include file signatures of whitelisted files and/or file signatures of blacklisted files. In an embodiment, the list of file signatures sent to the client 120 in each update cycle includes only new signatures that have not yet been sent to the client 120.

The network 110 represents the communication pathways between the security server 105 and clients 120. In one embodiment, the network 110 is the Internet. The network 110 can also utilize dedicated or private communications links that are not necessarily part of the Internet. In one embodiment, the network 110 uses standard communications technologies and/or protocols. In addition, all or some of the links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Each client 120 comprises one or more computing devices capable of processing data as well as transmitting and receiving data via a network 110. For example, a client 120 may be a desktop computer, a laptop computer, a mobile phone, a tablet computing device, an Internet of Things (IoT) device, or any other device having computing and data communication capabilities. Each client 120 includes a processor 125 for manipulating and processing data and a storage medium 130 for storing data and program instructions associated with various applications. The storage medium 130 may include both volatile memory (e.g., random access memory) and non-volatile storage memory such as hard disks, flash memory, and external memory storage devices. In addition to storing program instructions, the storage medium 130 stores files 140, as well as various data associated with operation of the operating system 134, protection application 136, and other user applications 132.

In one embodiment, the storage medium 130 comprises a non-transitory computer-readable storage medium. Various executable programs (e.g., operating system 134, protection application 136, and user applications 132) are each embodied as computer-executable instructions stored to the non-transitory computer-readable storage medium. The instructions, when executed by the processor 125, cause the client 120 to perform the functions attributed to the programs described herein.

The operating system 134 is a specialized program that manages computer hardware resources of the client 120 and provides common services to the user applications 132. For example, a computer's operating system 134 may manage the processor 125, storage medium 130, or other components not illustrated such as, for example, a graphics adapter, an audio adapter, network connections, disc drives, and USB slots. A mobile phone's operating system 134 may manage the processor 125, storage medium 130, display screen, keypad, dialer, wireless network connections and the like. Because many programs and executing processes compete for the limited resources provided by the processor 125, the operating system 134 may manage the processor bandwidth and timing to each requesting process. Examples of operating systems 134 include WINDOWS, MAC OS, IOS, LINUX, UBUNTU, UNIX, and ANDROID.

The operating system 134 schedules the execution of processes (or "threads"). Scheduling may be based on a priority of each thread, where instructions associated with higher priority threads are scheduled for execution ahead of instructions for lower priority threads. Instructions for lower priority threads therefore may be executed as "background processes" during otherwise idle times between execution of instructions for higher priority threads. Thread priority may be set by a user or by a program that initiates the thread. In an embodiment, unless otherwise set, threads have a default priority. In an embodiment, threads may be designated as foreground threads or background threads by a user or by a program that initiates the thread. In an embodiment, thread priority is a numerical value. Unless otherwise set, threads are assigned a default priority value. The protection application 136 may set malware scans as threads with a priority value lower than the default priority value (making such a malware scan a "low priority thread" that executes when threads with higher priority, such as user applications 132, are idle).

The user applications 132 may include applications for performing a particular set of functions, tasks, or activities for the user. Examples of user applications 132 may include a word processor, a spreadsheet application, and a web browser. In some cases, a user application 132 can be a source of malware and may be associated with one or more of the files 140 stored on the client 120. The malware may be executed or installed on the client 120 when the user application 132 is executed or installed, or when an associated malicious file is accessed.

The protection application 136 detects and remediates potentially malicious files installed or otherwise stored on the client 120. To determine whether a given file is potentially malicious, the protection application 136 employs one or more anti-malware techniques, which may be signature-based or signatureless. One technique employed by the protection application 136 to determine whether a given file is potentially malicious is to perform a malware scan upon the file by checking it against a list of file signatures. As described herein, the protection application 136 locally performs lookahead malware scanning to improve system performance while still providing anti-malware protection.

In an embodiment, the protection application 136 accesses the security server 105 via the network 110 to perform a check of a file against one or more whitelists of known clean files and/or blacklists of known malware prior to classifying the file as being malicious or clean and taking appropriate remedial action, if necessary. The protection application 136 is described in greater detail with reference to FIG. 2.

Figure 2:
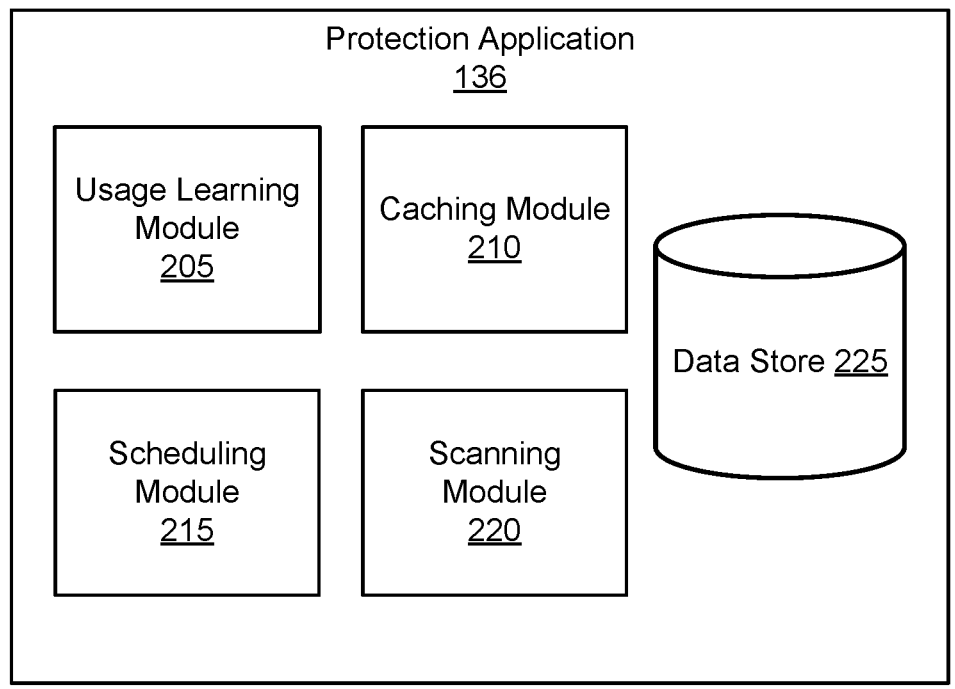
FIG. 2 is a block diagram illustrating a protection application, according to one embodiment.

FIG. 2 is a block diagram illustrating the protection application 136, according to one embodiment. The protection application 136 includes a usage learning module 205, a caching module 210, a scheduling module 215, a scanning module 220, and a data store 225. The protection application 136 performs lookahead malware scanning to provide anti-malware protection to the client 120 while reducing the computational burden of anti-malware techniques.

The usage learning module 205 monitors file execution on the client 120 to learn system usage behavior. The usage learning module 205 uses the learned system usage behavior to generate usage-based file lists associated with different time periods. In an embodiment, the usage learning module 205 tracks the times at which executable files are initiated over the course of a day and generates hourly usage-based file lists that predict usage for the following day, where each usage-based file list identifies executable files initiated during the respective hour.

In alternative implementations, the time period corresponding to each usage-based file list can be any length of time, e.g., one hour, half an hour, or fifteen minutes. Furthermore, in alternative embodiments, the usage learning module 205 may maintain usage-based file lists and track usage across longer periods of time, e.g., days, weeks, months, or years, to generate the usage-based file lists. For example, the usage learning module 205 may monitor which executable files are initiated during which hours on a rolling schedule of the past ten weekdays, on each Tuesday, on each Wednesday in October, or so on, and use this data to maintain the usage-based file lists. Maintaining the usage-based file lists may include adding executable files initiated in at least a threshold amount of the tracked time periods and/or removing executable files initiated in below a threshold amount of the tracked time periods or which have not been initiated in at least a threshold amount of time.

The usage learning module 205 shares data with the scheduling module 215, e.g., usage-based file lists, for use by the scheduling module 215, as described below. In alternative embodiments the usage learning module 205 may share data with other modules of the protection application 136, such as the caching module 210. The usage learning module 205 may store data, such as file lists or historic system usage behavior data, in the data store 225.

The caching module 210 maintains cached records for executable files that include data pertaining to past malware scans of respective executable files. As described below, the scheduling module 215 uses respective cached records of executable files to determine whether to perform malware scans for the executable files. In an embodiment, the cached records are stored together in a sparse hash data structure, which improves system performance by reducing query latency as well as the amount of data that is stored.

The cached record for an executable file can include various data, depending upon the embodiment. The cached record may include a timestamp indicating a time of a most recent malware scan for the respective executable file. The cached record may include an identifier of a most recent file signature, e.g., the last file signature in a list of file signatures against which the executable file was checked during a most recent malware scan. The cached record may include an identifier of a file signature to which the executable file matches, e.g., a file signature from a list of file signatures provided by the security server 105 identifying whitelisted and/or blacklisted files by file signature.

In an embodiment, the caching module 210 monitors activity upon the client 120 to track when changes are made to executable files. The cached record for an executable file may include a timestamp of a most recent write to the executable file. Alternatively or additionally, the cached record may include an indicator, such as a Boolean value, that indicates whether the executable file has been written to since a most recent malware scan of the executable file. For example, the Boolean value may be "0" if a write change has not been made to the executable file as of a most recent malware scan, and "1" otherwise.

In an embodiment, there are multiple types of file signatures, and lists of file signatures may be sub-categorized by file signature type. As such, the protection application 136 may only perform malware scans for executable files against a subset of a full list of file signatures, e.g., against only file signatures of one or several file signature types rather than all signature types in the list of file signatures. Against which types of file signatures to perform malware scans for an executable file may be indicated by a respective cached record. The cached record for an executable file can include, for each file signature type, an indicator, such as a Boolean value, indicating whether to scan against file signatures of the file signature type. For example, the Boolean value for a particular file signature type may be "0" to indicate malware scans are not to scan against file signatures of the file signature type and "1" to indicate malware scans are to scan against file signatures of the file signature type. Depending upon the embodiment, the cached record for an executable file may additionally include, for each of one or more file signature types, a timestamp or other indicator of a most recent malware scan against file signatures of the respective file signature type. As such, depending upon the embodiment, a scheduled malware scan may only check against file signatures of the file signature type added to the list of file signatures after a time of a most recent malware scan, rather than against all file signatures of the file signature type. The indicator may indicate, e.g., by a null value or "0" value, that a malware scan against file signatures of a particular file signature type has not previously been performed upon the client 120 for the respective executable file of the cached record. As such, a scheduled malware scan may check the executable file against all file signatures of the particular file signature type.

In an embodiment, the cached record for an executable file includes usage-based data, e.g., indicators of time periods within which the executable file was launched. The various data of a cached record for an executable file is used by the scheduling module 215 to determine whether and how to schedule a malware scan for the executable file.

The scheduling module 215 determines whether to schedule malware scans for executable files during an appropriate time period. The scheduling module 215 determines whether to perform malware scans for executable files based on usage-based file lists and cached records of executable files in the usage-based file lists. For a time period, the scheduling module 215 retrieves a respective usage-based file list that identifies executable files expected to be launched during the time period, such as from the data store 225 or from the usage learning module 205, depending upon the embodiment. The scheduling module 215 may do this at the beginning of or during a preceding time period, e.g., a prior time period immediately preceding the time period.

In an embodiment, in addition to a usage-based file list, the scheduling module 215 can additionally schedule malware scans based on a frequently used file list and/or a location-based file list, e.g., according to user settings. The frequently used file list includes high use files, e.g., executable files identified by the security server 105 as frequently used files, and/or files that the usage learning module 205 detects as initiating in at least a threshold number of time periods per day. For example, frequently used file lists may include web browsers, word processors, or spreadsheet applications. Location-based file lists include executable files located at high risk storage locations within the client 120, e.g., executable files on a desktop or home screen of the client 120, or in a "documents" file folder. In an embodiment, high risk storage locations may be determined by data received from the security server 105. In an embodiment, the inclusion of a frequently used file list and/or a location-based file list in a usage-based file list depends upon whether at least a threshold amount of time has passed since a most recent scan of the respective list. For example, frequently used file lists and/or location-based file lists may be included in usage-based file lists periodically. The scheduling module 215 schedules malware scans for executable files in frequently used file lists and location-based file lists as low priority threads, with a lower priority than malware scans scheduled based off a usage-based file list.

For each executable file identified by the usage-based file list, the scheduling module 215 evaluates a respective cached record of the executable file to determine whether to schedule a malware scan for the executable file during the prior time period in advance of when the executable file is predicted to be launched. The scheduling module 215 also uses an up to date list of file signatures in the determination, e.g., a list of file signatures incorporating all file signatures received from the security server 105 up to that point in time, which may differ from a list of file signatures used in a prior malware scan for an executable file.

If the cached record for an executable file indicates that the executable file has not been scanned before, the scheduling module 215 determines to schedule a malware scan for the executable file against all file signatures in the list of file signatures for each type of file signature indicated by the cached record as file signature types against which the executable file is to be scanned. If the cached record for an executable file indicates that the executable file corresponds to a file signature that is not in the list of file signatures, the scheduling module 215 overwrites the cached record to remove the indication that the executable file corresponds to the file signature. This may occur, for example, when the current list of file signatures is an updated list of file signatures that incorporates one or more updates from the security server 105 that were received after a most recent malware scan of the executable file, where one of the updates removed the file signature from the list. In this case, the scheduling module 215 determines to schedule a malware scan for the executable file against all file signatures in the list of file signatures for each type of file signature indicated by the cached record as file signature types against which the executable file is to be scanned. If the cached record for an executable file indicates that the executable file has been written to more recently than a most recent malware scan for the executable file, the scheduling module 215 determines to schedule a malware scan for the executable file against all file signatures in the list of file signatures for each type of file signature indicated by the cached record as file signature types against which the executable file is to be scanned. In these listed cases, if the list of file signatures does not include types of file signatures and/or the cached record does not indicate file signature types to scan against, the scheduling module 215 schedules a scan for the respective executable file against all file signatures in the list of file signatures.

If the cached record for an executable file indicates that the executable file matches a file signature, and the file signature is still in the list of file signatures, the scheduling module 215 determines to not schedule a malware scan for the executable file. If the cached record for an executable file indicates a most recent malware scan, the scheduling module 215 determines to schedule a malware scan for the executable file against file signatures in the list of file signatures that have been added as of the most recent malware scan, for each type of file signature indicated by the cached record as file signature types against which the executable file is to be scanned. If the list of file signatures does not include types of file signatures and/or the cached record does not indicate file signature types to scan against, the scheduling module 215 schedules a scan for the respective executable file against all file signatures in the list of file signatures that have been added as of the most recent malware scan.

The scheduling module 215 schedules each malware scan as a low priority thread for execution by the client 120. For example, each scheduled malware scan may be scheduled as a background process that only executes at times when there is no high priority or foreground process to execute, or as a thread with a priority value lower than the default priority value. In this manner, the client 120 will not attempt to execute the malware scans while the system is in active use, e.g., by a user, but rather during otherwise idle times when the processor is available. This improves system performance by avoiding the scheduling of many processes in a way that affects performance of foreground threads, e.g., threads of user applications 132 used by a user of the client 120, instead spreading them out among low use moments over the course of a time period preceding the expected executable file launch time. In an embodiment, if a first time period preceding a second time period corresponding to a usage-based file is tracked as a high usage period, the scheduling module 215 schedules malware scans earlier in the time period, while if the first time period is a low usage period, the scheduling module 215 schedules malware scans closer to the end of the time period, and therefore closer to the predicted launch time.

The scanning module 220 performs scheduled malware scans upon executable files to determine whether the executable files are potential malware. Depending upon the embodiment, the scanning module 220 may perform one or more types of malware scans upon one or more executable files. For example, the scanning module 220 may perform signature-based or signatureless malware detection techniques. The scanning module 220 performs signature-based malware scans using lists of file signatures against executable files in usage-based file lists as scheduled by the scheduling module 215. If a malware scan determines that an executable file matches a file signature, the scanning module 220 updates the respective cached record to indicate the matching file signature. The scanning module 220 may also update the respective cached record to indicate the time of the malware scan, a last file signature in the list of file signatures at the time of the scan, and so on. If a matching file signature corresponds to potential malware, the scanning module 220 may take one or more anti-malware actions, such as blocking launch of the respective executable file, alerting a user of the client 120, alerting the security server 105, quarantining the respective executable file, deleting the respective executable file, or so on.

The data store 225 stores data for the protection application 136, such as lists of file signatures, cache records, and so on. The data store 225 may be a relational or non-relational database. Depending upon the embodiment, the data store 225 may be an aspect of the files 140.

Figure 3:
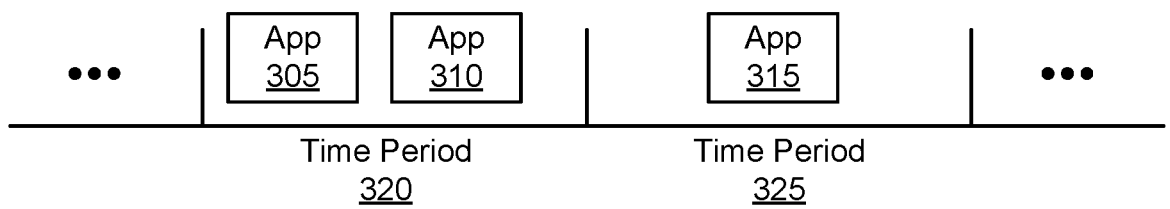
FIG. 3 is a timeline diagram illustrating application access monitoring, according to one embodiment.

FIG. 3 is a timeline diagram illustrating application access monitoring, according to one embodiment. During a first time period 320, two executable files ("Apps") are initiated: App 305 and App 310. During a second time period 325, one executable file 315 is initiated. The usage learning module monitors these initiations and associates Apps 305,310 with a usage-based file list for time period 320 and App 315 with a usage-based file list for time period 325.

For example, time period 320 may be 2:00 PM-3:00 PM and time period 325 may be 3:00 PM to 4:00 PM, each on a particular Tuesday. The next day, Wednesday, the scheduling module 215 determines whether to perform malware scans for Apps 305,310 to be executed during a preceding time period (e.g., 1:00-2:00 PM) for the usage-based file list corresponding to time period 320 and whether to perform a malware scan for App 315 to be executed during the first time period 320 for the usage-based file list corresponding to time period 325. In this manner, Apps 305,310,315 can be scanned in the background, if needed, prior to expected application launch, improving system performance.

Figures 4A, 4B:
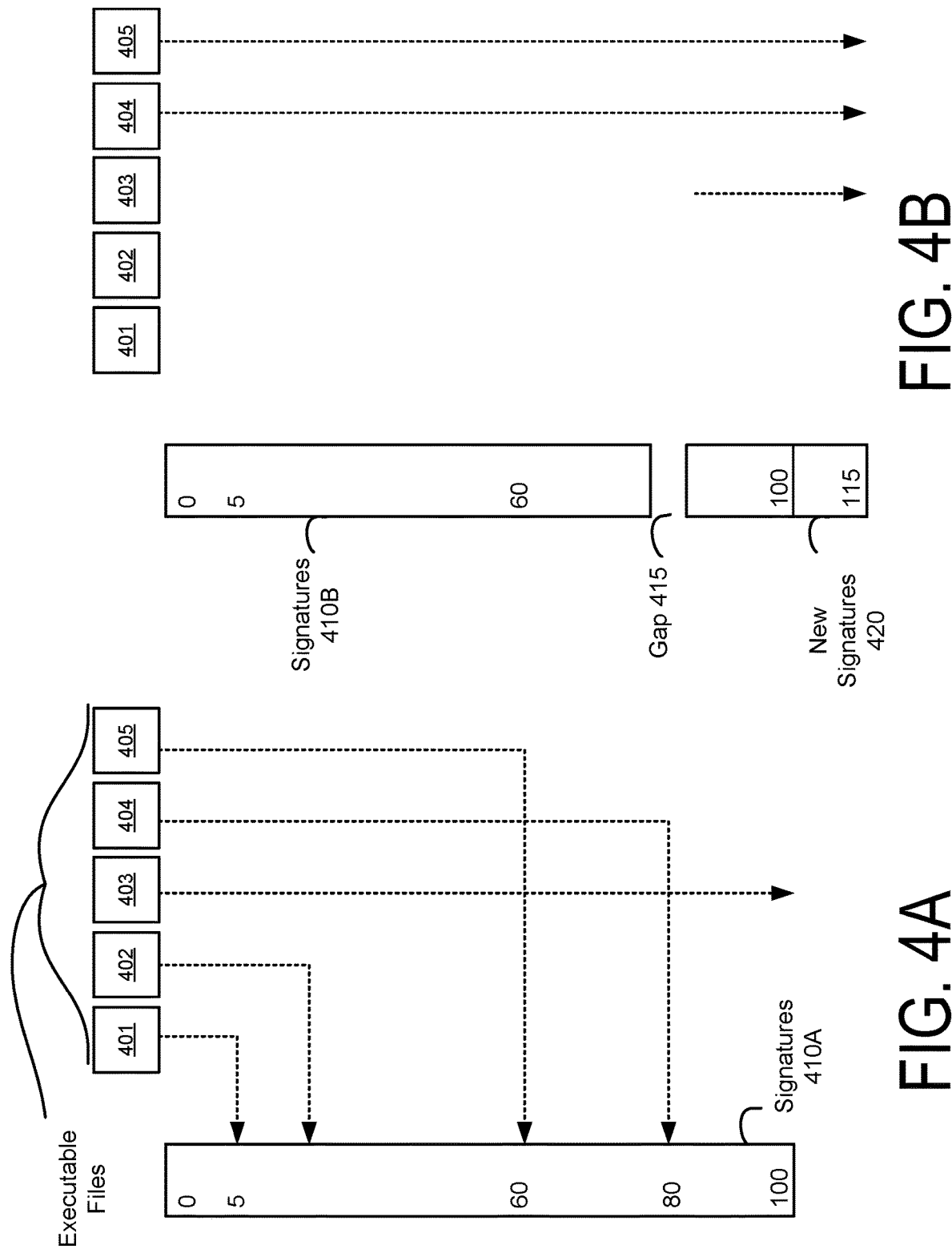
FIG. 4A is a diagram illustrating a correspondence of executable files to file signatures at a first time, according to one embodiment
FIG. 4B is a diagram illustrating a correspondence of executable files to file signatures at a second time, according to one embodiment.

FIGS. 4A-B are diagrams illustrating a caching technique based on tracking of correspondence of executable files to file signatures at a first time and a second time, respectively, according to one embodiment. In FIG. 4A, each executable file 401-405 is compared against a list of signatures 410A (e.g., signatures 0-100). If an executable file matches a file signature, the scan for that executable file ends and a record is stored of the matching signature identifier. For example, in FIG. 4A, the executable file 401 corresponds to a fifth signature (ID=5) in list of file signatures 410A. In this example, the fifth signature corresponds to a whitelisted file, so executable file 401 is identified as a trusted file, and its scan ends. Executable file 402 corresponds to a tenth signature (ID=10) in the signatures 410A. In this example, the tenth signature corresponds to a blacklisted file, so executable file 402 is identified as malicious, and the scan ends. Executable file 403 does not match any of the signatures 410A and is deemed unknown. Executable file 404 corresponds to an eightieth signature (ID=80) in the signatures list 410A. The eightieth signature corresponds to a blacklisted file, so executable file 404 is identified as malicious. Executable file 405 corresponds to a sixtieth signature (ID=60) in the signatures 410A. The sixtieth signature is a whitelisted file, so executable file 405 is identified as a trusted file, and its scan ends.

In FIG. 4B, an updated signature list 410B is obtained. The new signatures 410B largely correspond to the signatures 410A, with a few differences. The new list of file signatures 410B removes signature 80 as denoted by the gap 415. The new list of file signatures 410B also includes a block of new signatures 420 including signatures 101-115.

Based on the cached data from the scan in FIG. 4A, executable files 401 and 402 need not be rescanned because they are known to correspond to signatures 5 and 10 respectively, and these signatures 5, 10 are still in the updated list 410B. Executable file 403 can be scanned only against the new signatures 420 (including signatures 100-115) since the cached data shows that executable file 403 has already been checked against the signatures 0-79 and 81-100 in signature list 410A that have not changed in signature list 410B.

The cached data indicates that executable file 404 matched signature 80, which is no longer in the updated signature list 410B. However, the cached data also indicates that executable file 403 did not match signatures 0-79 that were compared against executable file 403 prior to the scan ending at signature 80. Therefore, the malware scan now checks the executable file 404 against all signatures in the new list of file signatures 410B that were not previously compared, which includes signatures 81-115. In this example, no matches are found and executable file 403 is deemed unknown.

In this example, executable files 404 and 405 are determined to have been edited since the scan of FIG. 4A. Therefore, the malware scan rechecks the executable files 404-405 against all signatures in the new list of file signatures 410B. In this example, no matches are found.

FIG. 5 is a flowchart illustrating an embodiment of a process 500 for performing lookahead signature-based malware detection. The protection application 136 determines 502 a usage-based file list identifying one or more executable files predicted to be used during a first time period. Here, the protection application 136 predicts usage based on a tracked usage history of each executable file. The protection application 136 may predict that an executable file will be launched during the first time period if the tracked usage history indicates use of the application during one or more prior corresponding time periods such as, for example, the same time window on a prior day or set of previous days.

The protection application 136 determines 504, for each executable file in the usage-based file list, whether to perform a malware scan, based on a cached record for the executable file. The cached record track detection results for the executable file in relation to past malware scans and thus indicate, depending on whether or not the file or the malware definitions have changed, if a new scan is warranted. Depending upon the cached records, the protection application 136 may determine 504 to schedule a malware scan, to not schedule a malware scan, or to schedule a partial malware scan for each executable file.

If a new scan is warranted, the protection application 136 schedules 506 the malware scan for execution during a preceding time period before the first time period when application usage is predicted. The scheduled malware scans are executed as a low priority process such that they are performed when the processor is available rather than at times when the processor is busy executing foreground processes.

The protection application 136 performs 508 each scheduled malware scan during the preceding time period prior to the predicted launch time. The protection application 136 takes one or more anti-malware actions if a malware scan determines that an executable file is potentially malware.

The above-described system and processes beneficially enable reliable detection and remediation of malware. By performing lookahead scans, the use of computing resources can be distributed across time and limited to applications that will likely be used, thereby reducing scanning time at application launch.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A computer-implemented method, comprising:
   determining, for a first time period, a usage-based file list identifying one or more executable files predicted to be used during the first time period;
   determining, for each of the one or more executable files identified by the usage-based file list, whether to perform a malware scan upon the executable file based on a cached record for the executable file;
   scheduling, for execution during a preceding time period before the first time period, a malware scan for at least one of the one or more executable files based on the corresponding determination of whether to perform a malware scan, wherein each scheduled malware scan is scheduled as a low priority thread for execution; and
   performing each scheduled malware scan during the preceding time period.

2. The computer-implemented method of claim 1, wherein the usage-based file list for the first time period comprises identifiers of executable files that were launched during a prior time period predicted to have a similar usage pattern to the first time period.

3. The computer-implemented method of claim 1, further comprising:
   scheduling, for execution during the preceding time period, a malware scan for a particular executable file in at least one of a frequently used file list and a location-based file list, wherein the malware scan for the particular executable file is scheduled with a lower priority than malware scans scheduled for executable files in the usage-based file list.

4. The computer-implemented method of claim 1, wherein the usage-based file list for the first time period further comprises identifiers of one or more high use executable files.

5. The computer-implemented method of claim 1, wherein determining, for a particular executable file identified by the predicted file list, whether to perform a malware scan upon the particular executable file based on a cached record for the particular executable file, comprises:
   wherein the cached record for the particular executable file indicates that the particular executable file does not match any signature from a list of file signatures as of a time of a most recent malware scan of the particular executable file;

determining that the list of file signatures comprises signatures added since the time of the most recent malware scan of the particular executable file; and
determining to perform the malware scan of the particular executable file using the signatures added since the time of the most recent malware scan of the particular executable file.

6. The computer-implemented method of claim 1, wherein determining, for a particular executable file identified by the predicted file list, whether to perform a malware scan upon the particular executable file based on a cached record for the particular executable file, comprises:
wherein the cached record for the particular executable file indicates that the particular executable file matches a particular signature from a list of file signatures;
determining that the particular signature is not in an updated list of file signatures; and
determining to perform the malware scan of the particular executable file using the updated list of file signatures.

7. The computer-implemented method of claim 1, wherein determining, for a particular executable file identified by the predicted file list, whether to perform a malware scan upon the particular executable file based on a cached record for the particular executable file, comprises:
determining that the particular executable file has been changed since a most recent scan of the particular executable file, wherein a time of the most recent scan is stored in the cached record; and
determining to perform a malware scan of the particular executable file using a list of file signatures.

8. The computer-implemented method of claim 1, wherein determining, for a particular executable file identified by the predicted file list, whether to perform a malware scan upon the particular executable file based on a cached record for the particular executable file, comprises:
wherein the cached record for the particular executable file indicates that the particular executable file matches a particular signature from a list of file signatures;
determining that the particular signature is still in the list of file signatures; and
responsive to determining that the particular signature is still in the list of file signatures, determining to not perform a malware scan for the particular executable file.

9. The computer-implemented method of claim 1, wherein determining, for a particular executable file identified by the predicted file list, whether to perform a malware scan upon the particular executable file based on a cached record for the particular executable file, comprises:
determining that the cached record for the particular executable file indicates the particular executable file has not been scanned for a particular type of signature;
determining that the particular type of signature is to be scanned; and
determining to perform a malware scan for the particular executable file for all signatures of the particular type in a list of file signatures.

10. The computer-implemented method of claim 1, further comprising:
monitoring, for a particular time period, initiation of file execution upon the computer; and
generating, for the particular time period, a particular usage-based file list comprising identifiers of files for which execution was initiated during the particular time period.

11. A non-transitory computer-readable storage medium storing computer program instructions executable by a processor to perform steps, the steps comprising:
determining, for a first time period, a usage-based file list identifying one or more executable files predicted to be used during the first time period;
determining, for each of the one or more executable files identified by the usage-based file list, whether to perform a malware scan upon the executable file based on a cached record for the executable file;
scheduling, for execution during a preceding time period before the first time period, a malware scan for at least one of the one or more executable files based on the corresponding determination of whether to perform a malware scan,
wherein each scheduled malware scan is scheduled as a low priority thread for execution; and
performing each scheduled malware scan during the preceding time period.

12. The non-transitory computer-readable storage medium of claim 11, wherein the usage-based file list for the first time period comprises identifiers of executable files that were launched during a prior time period predicted to have a similar usage pattern to the first time period.

13. The non-transitory computer-readable storage medium of claim 11, wherein the usage-based file list for the first time period further comprises identifiers of executable files located at high risk storage locations.

14. The non-transitory computer-readable storage medium of claim 11, wherein the usage-based file list for the first time period further comprises identifiers of one or more high use executable files.

15. The non-transitory computer-readable storage medium of claim 11, wherein determining, for a particular executable file identified by the predicted file list, whether to perform a malware scan upon the particular executable file based on a cached record for the particular executable file, comprises:
wherein the cached record for the particular executable file indicates that the particular executable file does not match any signature from a list of file signatures as of a time of a most recent malware scan of the particular executable file;
determining that the list of file signatures comprises signatures added since the time of the most recent malware scan of the particular executable file; and
determining to perform the malware scan of the particular executable file using the signatures added since the time of the most recent malware scan of the particular executable file.

16. The non-transitory computer-readable storage medium of claim 11, wherein determining, for a particular executable file identified by the predicted file list, whether to perform a malware scan upon the particular executable file based on a cached record for the particular executable file, comprises:
wherein the cached record for the particular executable file indicates that the particular executable file matches a particular signature from a list of file signatures;
determining that the particular signature is not in an updated list of file signatures; and
determining to perform the malware scan of the particular executable file using the updated list of file signatures.

17. The non-transitory computer-readable storage medium of claim 11, wherein determining, for a particular executable file identified by the predicted file list, whether to perform a malware scan upon the particular executable file based on a cached record for the particular executable file, comprises:

determining that the particular executable file has been changed since a most recent scan of the particular executable file, wherein a time of the most recent scan is stored in the cached record; and determining to perform a malware scan of the particular executable file using a list of file signatures.

18. The non-transitory computer-readable storage medium of claim 11, wherein determining, for a particular executable file identified by the predicted file list, whether to perform a malware scan upon the particular executable file based on a cached record for the particular executable file, comprises:

wherein the cached record for the particular executable file indicates that the particular executable file matches a particular signature from a list of file signatures;

determining that the particular signature is still in the list of file signatures; and responsive to determining that the particular signature is still in the list of file signatures, determining to not perform a malware scan for the particular executable file.

19. The non-transitory computer-readable storage medium of claim 11, wherein determining, for a particular executable file identified by the predicted file list, whether to perform a malware scan upon the particular executable file based on a cached record for the particular executable file, comprises:

determining that the cached record for the particular executable file indicates the particular executable file has not been scanned for a particular type of signature;

determining that the particular type of signature is to be scanned; and determining to perform a malware scan for the particular executable file for all signatures of the particular type in a list of file signatures.

20. A system, comprising:

a processor; and a non-transitory computer-readable storage medium storing computer program instructions executable by the processor to perform steps, the steps comprising:

determining, for a first time period, a usage-based file list identifying one or more executable files predicted to be used during the first time period;

determining, for each of the one or more executable files identified by the usage-based file list, whether to perform a malware scan upon the executable file based on a cached record for the executable file;

scheduling, for execution during a preceding time period before the first time period, a malware scan for at least one of the one or more executable files based on the corresponding determination of whether to perform a malware scan, wherein each scheduled malware scan is scheduled as a low priority thread for execution; and performing each scheduled malware scan during the preceding time period.

\* \* \* \* \*